United States Patent Office 3,490,701
Patented Jan. 20, 1970

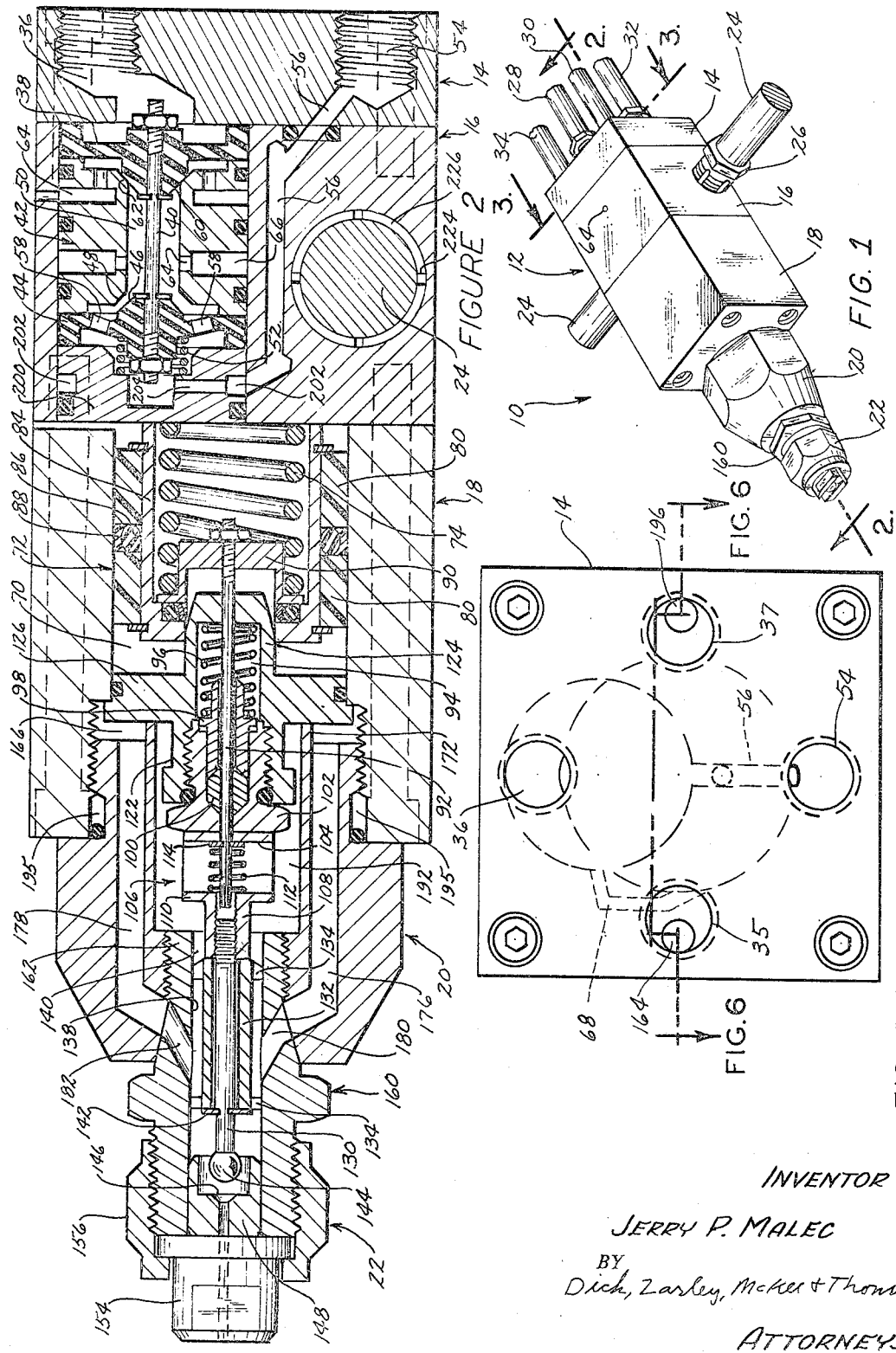

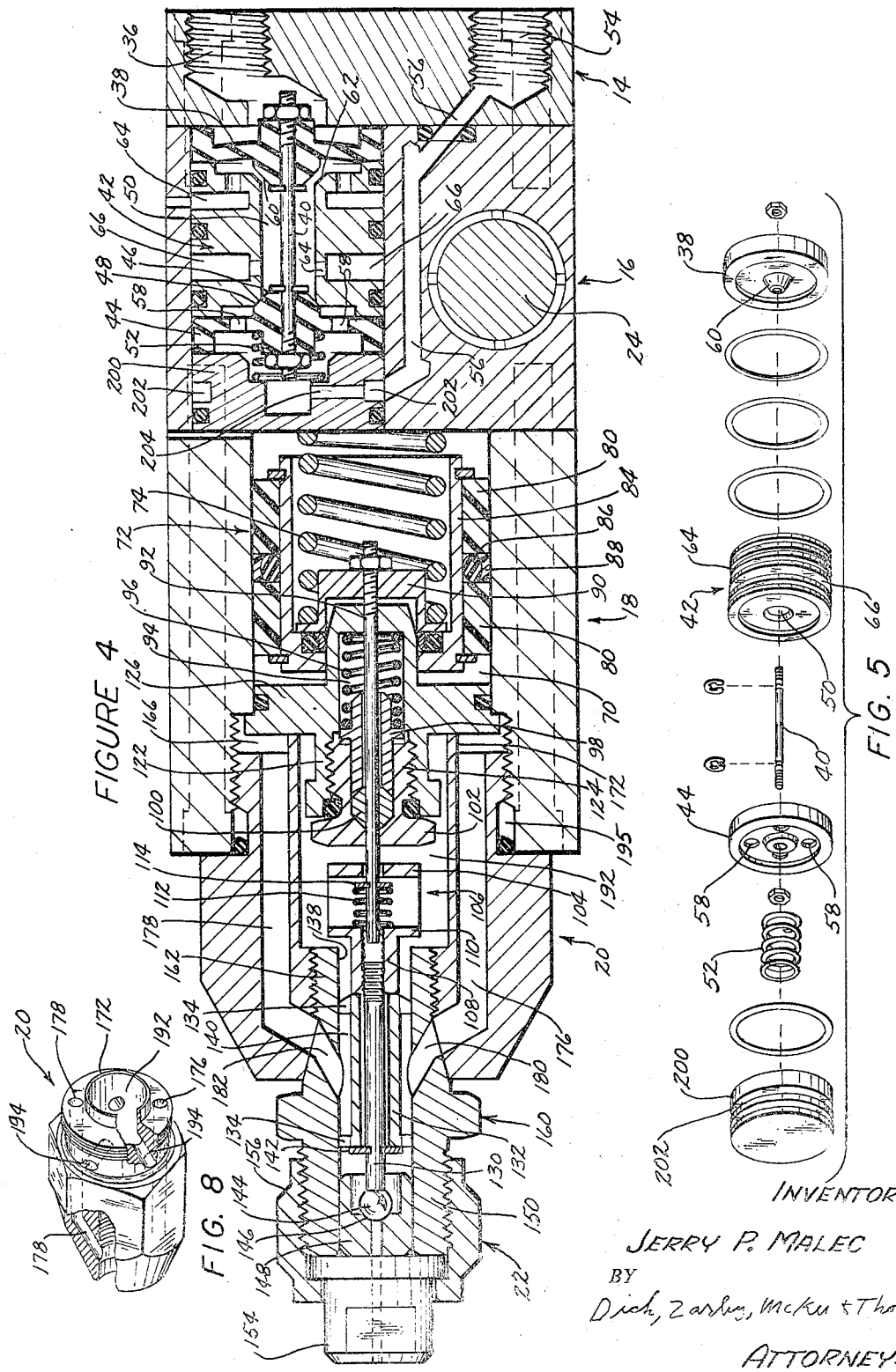

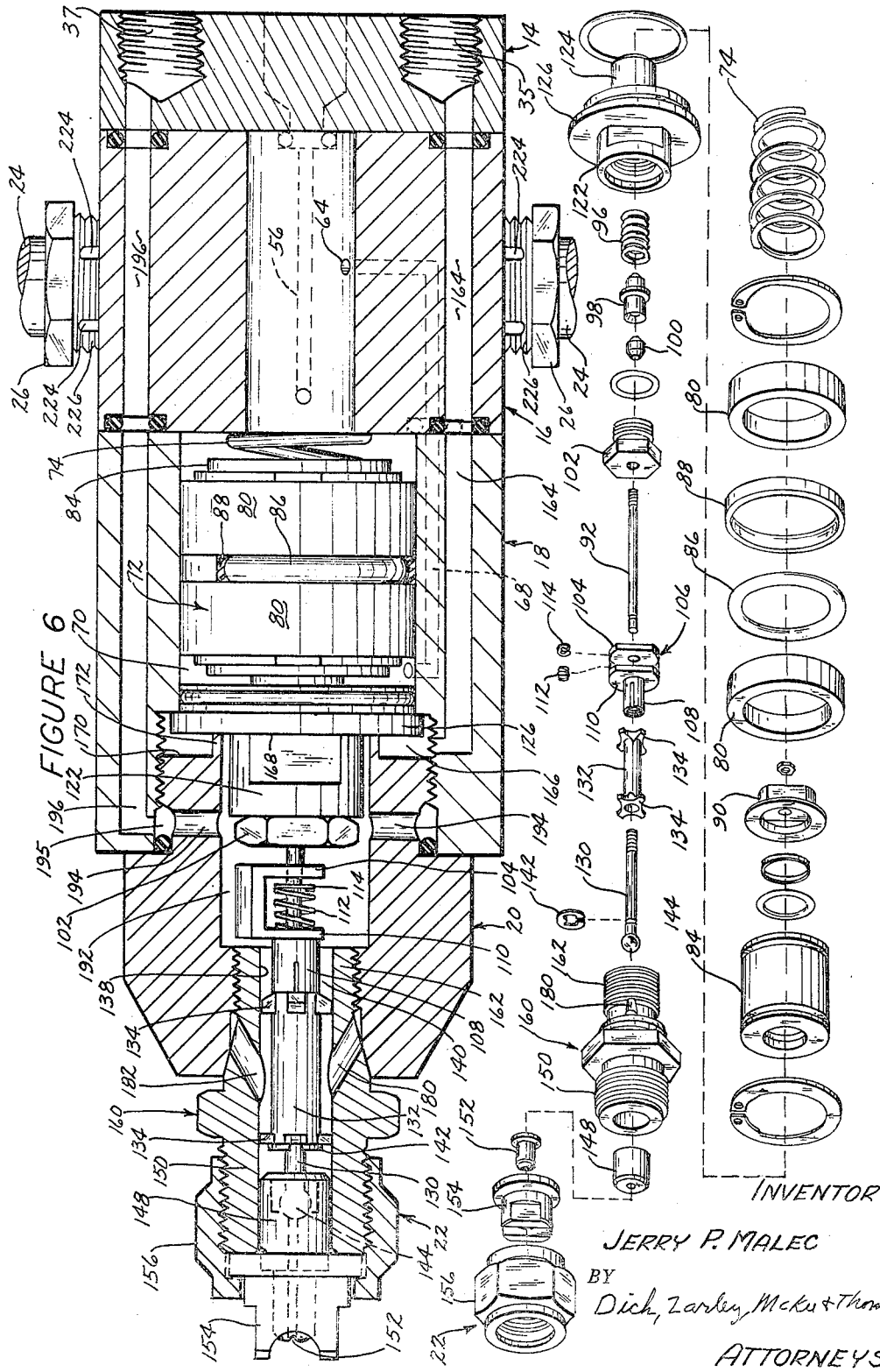

3,490,701
VALVE ASSEMBLY
Jerry P. Malec, Omaha, Nebr., assignor to Tri-Matic Equipment Co., Omaha, Nebr., a corporation of Nebraska
Continuation-in-part of application Ser. No. 575,353, Aug. 26, 1966. This application Apr. 22, 1968, Ser. No. 723,221
Int. Cl. B05b 1/30, 7/12; F16k 21/12
U.S. Cl. 239—584   14 Claims

ABSTRACT OF THE DISCLOSURE

A valve device having a valve member instantaneously actuated by an air piston which is in turn actuated by an air pilot valve unit. The valve body having a series of passageways connecting to the material inlet opening through an annular groove. The material inlet passageways being directed to the nozzle outlet opening. A recirculating outlet opening is in communication with the inlet passageways through a second annular groove having a series of outlet passageways extending to the area of the nozzle and outlet valve member.

---

This application is a continuation-in-part of application, Ser. No. 575,353 filed Aug. 26, 1966 which issued Nov. 12, 1968 as Patent No. 3,410,491.

The control of material such as paint requires an automatic airless spray unit capable of operating at 4000 cycles per minute. There can be no time delay between the triggering device and the valve member to achieve this high operational speed. There must be instantaneous opening and closing of the nozzle valve member. Moreover, it is desirable to have a quick detachable nozzle to provide speedy cleaning of the unit or changing of nozzles when necessary to obtain the desired spray pattern. Moreover, the mounting device for the valve assembly must be capable of being quickly engaged and disengaged from its support.

Thus this invention involves the use of an air actuated pilot valve for controlling an air actuated piston connected to the nozzle valve member whereby a small amount of air pressure in the pilot valve will permit a larger amount of air pressure to act upon the piston for opening the nozzle valve member. The pilot valve senses a pressure drop in the line and may be turned off and on quickly on the order of 10 times per second. A spring is provided for returning the piston to its normal position and thereby allowing the valve member to be closed by material pressure within the nozzle chamber area. A lost motion connection is provided between the piston and the valve member to assure instantaneous closing of the valve member. This feature is more fully described in my Patent No. 3,410,491.

The passageways in the valve body communicating with the nozzle outlet are such that clogging is substantially eliminated. A material inlet passageway communicates with an annular groove having a series of passageways extending to the material outlet nozzle. An elongated center axial opening extends through the valve body and includes the valve member. A plurality of outlet passageways extend from the center axial opening to a second annular co-axial groove which is in communication with a recirculating discharge passageway which may be open or closed as desired. The valve may be operated as a recirculating valve or as a deadend non circulating type valve.

The body member has an opening formed in it for receiving a support pipe member which is embraced by a collet threadably engaging the mounting opening in the valve body. The collet is longitudinally serrated to provide a series of peripheral portions and with the collet increasing in diameter from its inner end towards its outer end the supporting pipe is fixedly secured to the valve body by tightening the collet. By loosening the collet the pipe may be easily withdrawn as clearance is provided quickly by a few turns of the collet within the mounting opening.

These and other features and advantages of this invention will become readily apparent to those skilled in the art upon reference to the following description when taken into consideration with the accompanying drawings, wherein:

FIG. 1 is a fragmentary perspective view of the assembled valve assembly;

FIG. 2 is a longitudinal cross-sectional view of the valve assembly taken along line 2—2 in FIG. 1;

FIG. 3 is an end view taken along line 3—3 in FIG. 1;

FIG. 4 is a longitudinal cross-sectional view similar to FIG. 3 but showing the valve assembly with its components in their closed positions;

FIG. 5 is an exploded perspective view of the pilot unit;

FIG. 6 is a longitudinal cross-sectional view taken along line 6—6 in FIG. 3;

FIG. 7 is an exploded perspective view of the actuating piston and components connecting it to the nozzle valve member which is shown with the nozzle unit; and FIG. 8 is a fragmentary perspective view of the material body member and illustrates the numerous passageways formed therein.

The valve assembly of this invention is referred to generally in FIG. 1 by the reference numeral 10 and includes a valve body 12 formed by three bolted together sections 14, 16 and 18. A material body member 20 is threadably secured to the valve body section 18 and includes a nozzle unit 22 on its outer end. A support pipe member 24 extends through the valve body section 16 and is selectively locked in place by collets 26.

The rear section 14 includes a pilot air inlet pipe 28, a piston actuating air inlet pipe 30, a material inlet pipe 32 and a material outlet pipe 34.

An opening 36 in the valve body section 14 as seen in FIG. 4 is in communication with a flexible diaphragm element 38 carried on a rod 40 extending through a spool 42. A flexible pilot valve element 44 is carried on the opposite end of the spool and shaft and includes an inner annular shoulder 46 which matingly engages a cooperating shoulder 48 on the adjacent end of the spool 42 for closing a longitudinally extending center axial opening 50 in the spool 42. A spring 52 engages the pilot valve element 44 to maintain it in a normally closed condition.

A second opening 54 is provided in the section 14 and communicates through a passageway 56 with the valve element 44. Openings 58 are provided in the valve element 44 and permit passage of air from the inlet opening 54 between the annular shoulder 46 and its seat 48 when the valve element 44 is open as seen in FIG. 2. Air pressure on the diaphragm 38 causes the valve element 44 to be moved to the left as viewed in FIGS. 2 and 4 thus moving an annular shoulder 60 on the inner side of the diaphragm 38 into engagement with a cooperating annular seat shoulder 62 on the adjacent end of the spool 42. This closes off the inner axial opening 50 to communication with an outlet passageway 64. When the valve element 44 is opened by air pressure on the outer side of the diaphragm 38 the air from the inlet 54 flows through the openings 58 and into the axial opening 50 and then through port 64 to an annular groove 66 formed in the spool which is connected by a passageway 68 as seen in FIG. 6 which extends into the valve body section 18 where it is in communication with an annular passageway 70 on the forward side of a valve actuating piston 72 which is cylindrical in cross-section. A resistance spring 74 is provided in the piston 72 to oppose the air pressure from the inlet opening 54 passing through the passageway 68. A pair of strap seals 80 embrace the inner piston casing 84 and are on opposite sides of an O-ring 86 embraced by a Teflon slipper 88.

A cap shaped element 90 is mounted inside the piston casing 84 and inside the resistance spring 74 and has an elongated rod 92 secured on its axial center thereto. The rod 92 extends forwardly through a chamber 94 which includes a spring 96 bearing against a sleeve member 98 which engages a removable Teflon packing seal 100 which is adapted to seat against the inner face of a collet packing nut 102 to seal the opening therethrough for the rod 92. Outwardly of the collet 102 the rod extends through a wall 104 of a channel-shaped bracket 106 carried on the end of an elongated guide 108. An opposite wall 110 in the channel 106 provides a seat for a concentrically mounted spring 112 on the end of the rod 92. The bracket 106 is locked to the rod 92 by a snap ring 114. Thus a lost motion connection is provided between the guide member 108 and the rod 92 wherein the members may be contracted relative to each other against the action of the coil spring 112 which tends to maintain them in their expanded condition. The rod 92 extends through the chamber 94 formed in oppositely projecting elongated portions 122 and 124 extending from a stationary wall 126.

The guide portion 108 on the bracket 106 is internally threaded to receive a valve rod 130 which extends through a sleeve 132 having star-shaped disk elements 134 at opposite ends thereof which engage the inner side wall 138 of the material elongated body extension 160 which defines an elongated opening 140 which extends therethrough. The rod 130 is locked against longitudinal movement in a rearward direction relative to the sleeve 132 by a snap ring 142. A spherical stainless steel male valve element 144 is provided on the forward free end of the valve rod 130 and seats in a concave semi spherical cavity 146 in a cylindrical element 148 which is riveted into the forward end of the portion 150 of the material body 20. A nozzle element 152 is seated against the forward end of the member 148 and is positioned in a nozzle body 154 held to the portion 150 by a retainer sleeve 156.

The forward portion 150 is a part of an elongated unit 160 having a threaded opposite end 162 threadably engaged in the forward end of the material body 20.

The material inlet opening 35 as seen in FIG. 6 in the valve body section 14 is in communication with an elongated passageway 164 which extends to an annular passageway 166 formed by the adjacent ends 168 and 170 of the piston 72 and the material body 20 respectively. A base 172 is provided for the groove 166 by an outwardly extending shoulder on the material body member 20. As seen in FIG. 4 a pair of material passageways 176 and 178 diametrically opposite each other are formed in the material body 20 and extend forwardly for communication with passageway portions 180 and 182 respectively in the member 160 which are directed closely adjacent the ball valve element 144 in the elongated opening 140 defined by the side wall 138. As seen in FIGS. 6 and 8 the material body 20 having an inner chamber 192 includes a series of radially extending passageways 194 which are in communication with an annular passageway 195 which in turn is in communication with an elongated return passageway 196 extending through the valve sections 18, 16 and 14 to the material outlet opening 37. The outlet opening 37 may be closed if desired or opened if recirculation is desired.

Referring again to FIGS. 2 and 4 and 5 it is seen that in the pilot unit an inner cylindrical member 200 is provided having an annular groove 202 which is in communication with the high pressure air passage 56 through a diametrically extending passage 204.

The support pipe 24 extends through the valve body portion 16 and is readily inserted or removed by operation of the collets 26 through which the pipe extends. The collets are provided with elongated serrations 224 which form a series of peripheral portions 226. The collet increases in diameter from its inner end outwardly and accordingly as it is tightened it lockingly grips the pipe support 24.

In operation it is seen that a relatively low pilot valve air pressure of for example 45 pounds may be applied to the diaphragm 38 thereby opening the valve element 44 to permit relatively higher air pressure of 70 pounds minimum to enter the chamber 50 and communicate with the chamber 70 thus moving the piston 72 to the right as viewed in FIG. 2 and consequently moving the ball valve 144 off of its seat 146 to permit the flow of spray paint material or the like. Upon the termination of air pressure on the diaphragm 38 the valve element 44 will be closed as the annular shoulder 46 seats against the annular shoulder 48 thus permitting the compression spring 74 in the piston to move the piston to the left forcing the air in the chamber 70 back into the chamber 50 of the pilot unit. This air can then escape past the inner annular shoulder 60 on the diaphragm 38 to the annular groove 64 and then to the atmosphere. The pressures of the paint material or the like around the ball valve 144 will instantaneously cause it to seat and close the nozzle 152 and prevent all dripping. It is stressed that the cycles of operation permitted is almost unlimited by use of the self-contained pilot valve unit for controlling the air piston which in turn controls the material valve 144.

The paint material or the like which enters the valve assembly through the opening 35 as previously discussed communicates the annular groove 166 and then passes through the longitudinally extending passageways 176 and 178 into communication with the passageways 180 and 182 which direct the material to the area of the ball valve 144. If the ball valve is open the material is sprayed through the nozzle 152. If the material is being recirculated or is not all sprayed from the unit it is then returned through the center opening 140 in the elongated member 160 into the chamber 192 in the material body 20 for communication with one of the plurality of radial passageways 194 which are in communication with the elongated outlet passageway 196 extending back to the outlet opening 37.

It is to be appreciated that the nozzle 152 may be quickly cleaned or replaced by removal of the retainer 156 which is threaded onto the portion 150 of the elongated material body member 160. This operation may be performed in a matter of seconds. Additionally, the whole valve assembly may be disassembled very quickly if necessary. It is further pointed out that the unique circulation system greatly facilitates the elimination of clogging problems of the material being sprayed.

Some changes may be made in the construction and arrangement of my valve assembly without departing from the real spirit and purpose of my invention, and it is my intention to cover by my claims, any modified forms of structure or use of mechanical equivalents which may be reasonably included within their scope.

I claim:
1. A valve assembly, comprising:
    a body member having material inlet and outlet openings,
    a valve for opening and closing said outlet opening,
    an air source,
    a piston means for communication with said air source and operatively connected to said valve for opening and closing said valve in response to air pressure on said piston means, a passageway connecting said piston to said air source and a pilot valve disposed in said passageway between said air source and said piston, trigger means for operating said pilot valve between open and closed position, and a second air source being operatively connected to said pilot valve for opening and closing it in said passageway.

2. The structure of claim 1 wherein a spring engages said piston to actuate said piston in the opposite direction from said air source, said piston moving in response to said air pressure to open said valve upon said air pressure exceeding the resisting force of said spring.

3. The structure of claim 1 wherein a spring means yieldably engages said pilot valve to maintain it normally closed.

4. The structure of claim 3 wherein said pilot valve includes a diaphragm connected to said pilot valve, said diaphragm being in communication with said second air source whereby pressure on said diaphragm from said second air source moves said pilot valve to an open position against the action of said spring means.

5. The structure of claim 4 wherein a conduit extends from said passageway to the atmosphere, a relief valve in said conduit and operatively connected to said diaphragm, said pilot spring means normally maintaining said pilot valve closed and said relief valve open and said second air source adapted to apply pressure in the opposite direction on said diaphragm to close said relief valve and open said pilot valve.

6. The structure of claim 5 wherein said pilot valve and said diaphragm are mounted on a common shaft to move together as a unit.

7. The structure of claim 6 wherein a spool is mounted on said shaft between said pilot valve and said diaphragm, said spool having a longitudinal center axial opening around said shaft and an annular outer groove, a port connecting said opening with said annular groove, said passageway having an inlet portion in communication with said center opening through said pilot valve and an outlet portion in communication with said annular groove, and said outlet portion being in communication with said piston.

8. The structure of claim 7 wherein said diaphragm includes an annular shoulder which is movable into and out of engagement with a cooperating seat on said spool to define said relief valve.

9. The structure of claim 8 wherein said pilot valve further is defined as having an annular shoulder movable into and out of engagement with a cooperating seat on said spool, and said seat for said pilot valve and said seat for said relief valve being on opposite ends of said spool.

10. A valve assembly, comprising:
a body member having material inlet and outlet openings,
a valve for opening and closing said outlet opening,
an air source,
a piston means for communication with said air source and operatively connected to said valve for opening and closing said valve in response to air pressure on said piston means,
and said body member including an elongated longitudinal center opening and an annular concentric groove therearound, said material inlet opening being in communication with said annular groove, at least one inlet passageway connecting said annular groove with said outlet opening through said valve member, said valve member being movable in said center opening, a second annular groove concentric about said center opening, a second passageway connecting said center opening with said second annular groove, and said outlet opening having a second outlet opening in communication with said second annular groove.

11. The structure of claim 10 wherein said first outlet opening has a nozzle for controlling the flow of material therethrough, said valve member in its closed position closing only said first outlet opening and said second outlet opening being open for the circulation of material.

12. The structure of claim 11 wherein the connection of said piston to said valve member includes a lost motion connection for said valve member to snap closed at times independently of said piston.

13. The structure of claim 12 wherein a dampening spring is included in said lost motion connection and a relatively substantially stronger spring engages said piston to move said valve member to said closed position.

14. A valve assembly, comprising:
a body member having material inlet and outlet openings,
a valve for opening and closing said outlet opening,
an air source,
a piston means for communication with said air source and operatively connected to said valve for opening and closing said valve in response to air pressure on said piston means,
at least one mounting opening is provided in said body, a support pipe member is positioned in said opening, and a collet sleeve embraces said pipe and threadably engages the inner side walls of said mounting opening, said sleeve being longitudinally serrated around its periphery to provide a plurality of peripheral portions, and the outer diameter of said collet increasing from its inner end towards its outer end whereby upon tightening of said collet said pipe is lockingly gripped by said peripheral portions.

References Cited

UNITED STATES PATENTS 2,052,953   9/1936   Tracy _____ 251—63.4 X
2,266,365   12/1941  Harrison et al. ___ 251—63.4 X EVERETT W. KIRBY, Primary Examiner U.S. Cl. X.R.

239—410; 251—28, 63.6